UNITED STATES PATENT OFFICE.

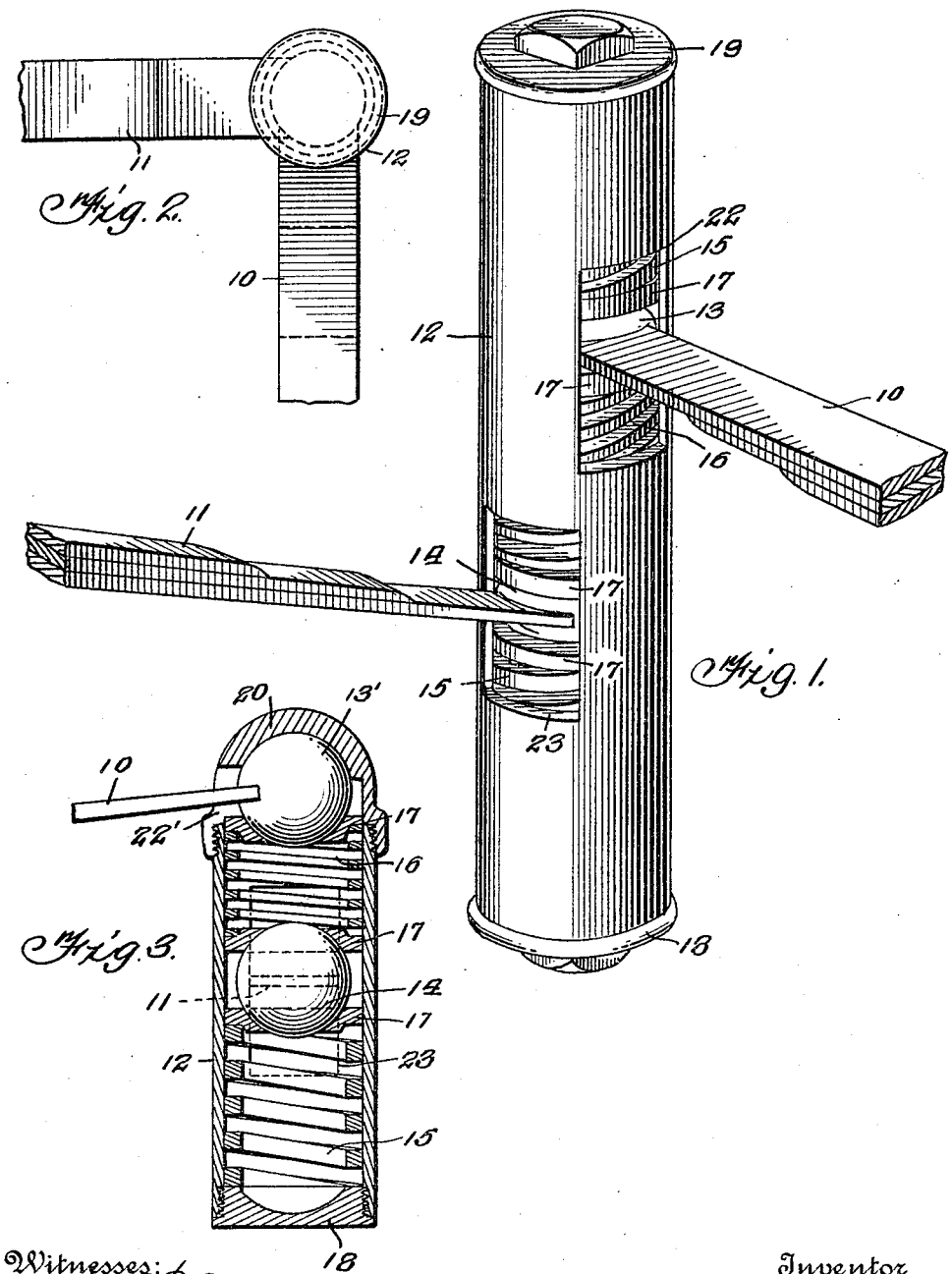

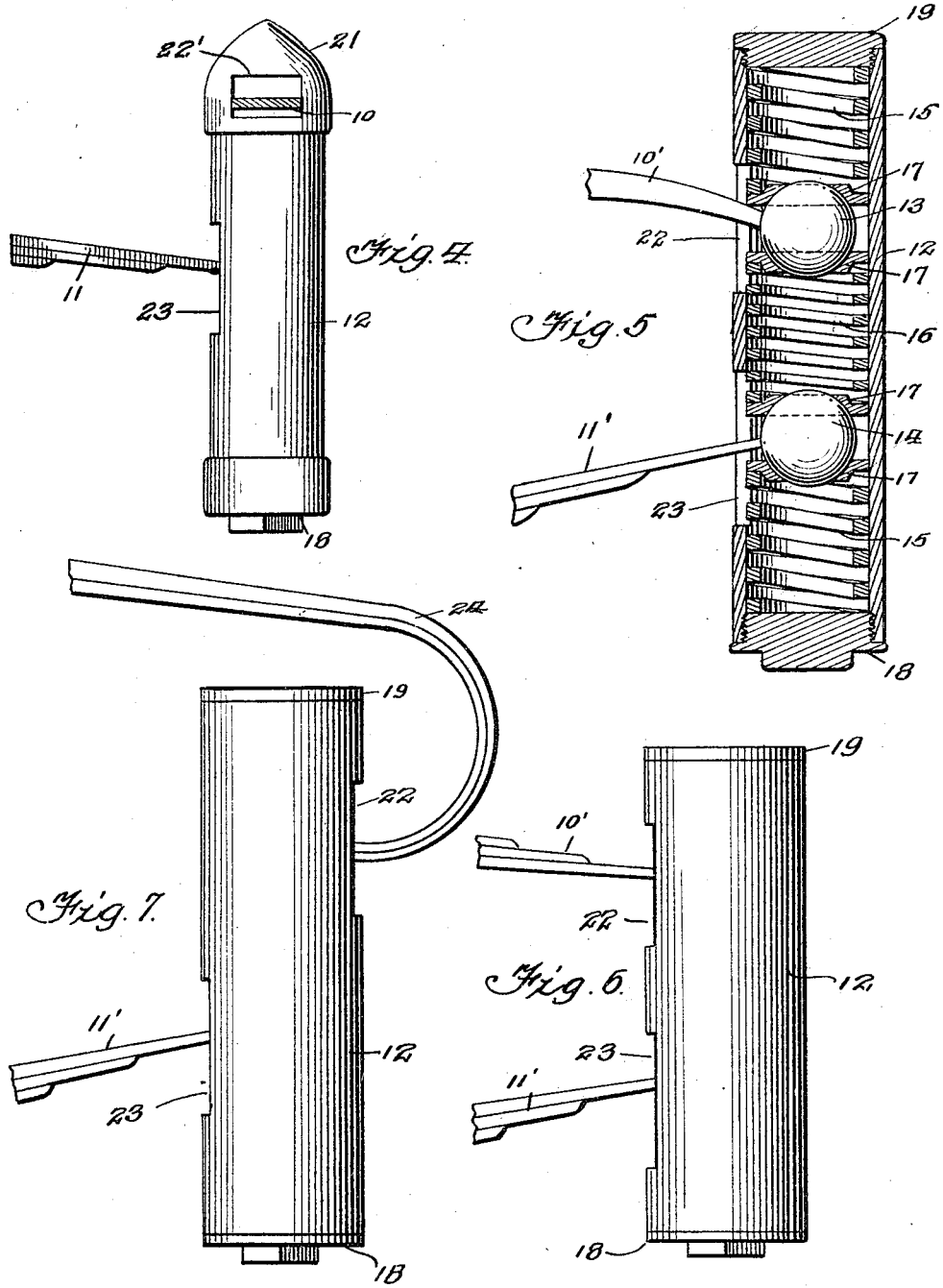

RICHARD T. NEWTON, OF NEW YORK, N. Y.

VEHICLE.

1,230,762.  Specification of Letters Patent. Patented June 19, 1917.

Application filed July 10, 1913. Serial No. 778,248.

*To all whom it may concern:*

Be it known that I, RICHARD T. NEWTON, a citizen of the United States, and a resident of New York, in the county of New York and State of N. Y., have invented certain new and useful Improvements in Vehicles, of which the following is a specification.

This invention relates to vehicles provided with shock absorbers or eliminators, and has in view the prevention or neutralization of shocks and vibrations when a wheel of a vehicle passes over a large object, and also the prevention or neutralization of the minor shocks and vibrations that are caused when the wheels of a vehicle pass over minor objects, and to provide against which is the special and main function of rubber tires.

The invention consists of a vehicle provided with casings held by and connecting contiguous leaf springs and containing coiled springs and actuating parts, all arranged as will now be described, reference being had to the following specification and claims and the drawings in which—

Figure 1 is an elevation showing two leaf springs at right angles connected by a shock absorber, Fig. 2 is a top view of same, Fig. 3 shows a modified form in which the upper coiled spring is omitted, Fig. 4 is an elevation of a slightly modified form of the device shown in Fig. 3.

Fig. 5 is a sectional view showing two leaf springs in the same plane connected by a shock absorber, Fig. 6 is an elevation of the device shown in Fig. 5, and Fig. 7 is an elevation showing one of the leaf springs of a different pattern.

Referring to the drawing there are shown two leaf springs 10 and 11 (Figs. 1 to 4) at right angles to each other, for instance such as ordinary so called platform springs. In Figs. 5 and 6 are shown leaf springs 10' and 11' lying in the same plane, and in Fig. 7 are shown a bent spring 24 and a lower spring 11', like the one shown in Fig. 5. The leaf springs of whatever pattern, have attached to them balls, 13 and 14 in the casing 12. The balls are placed between the exterior springs 15 and the interior lighter spring 16 (Figs. 1, 5 and 6.) The balls are free to turn in the socket plates 17, whereby the pressure of the balls as they move is always in a direction parallel with the casing. In the modified form of construction shown in Figs. 3 and 4 the upper of the springs 15 is omitted and the interior of the cap 20 forms a concave hemisphere so as to serve as a socket for the upper ball 13'. In Figs. 5, 6 and 7 the top of the cylinder 12 is shown as being closed by a flat cap 19, in Fig. 3 by a hemispherical cap 20, and in Fig. 4 by a cap 21 pointed exteriorly and hemispherical interiorly. The leaf springs pass through slots 22 and 23, in which they reciprocate. In Figs. 3 and 4, the slot 22' is shown as being short, because in this form of construction the vertical movement of the end of the spring inside the casing is insignificant.

The action of the coiled springs is as follows: When a shock is imparted to spring 10 it results in an upward movement against the spring 15, the light spring 16 following so as to maintain tension and to avoid clicking and deterioration of the springs 15. When the spring 11 is subjected to a shock it moves downward compressing the lower spring 15, the central light spring 16 following so as to maintain tension throughout the casing.

When in the modified form of the invention shown in Fig. 3 a shock is imparted to the leaf spring 10 it moves upward, but as the ball 13 with which it is connected rests against the top or cap 20 of the casing 12, the casing 12 moves with the leaf spring 10 resulting in compression of the lower spring 15, which thus becomes active when either of the leaf springs 10 or 11 is moved.

When both the leaf springs lie in the same plane, as shown in Figs. 5 to 7, the action of the coiled springs is the same as that just described.

On account of the combination of the double set of stronger coiled springs and the lighter intermediate coiled springs or the equivalent structure shown in Fig. 3, this arrangement is at the same time very sensitive to light shocks whereby it greatly assists and improves the normal operation of rubber tires, pneumatic or others, thereby also prolonging their life, but it likewise greatly assists and improves the normal operation of the leaf springs.

Various modifications of the invention described may be made in addition to those shown without departing from its spirit. Thus the socket plates 17 may be attached to one of the adjacent coiled springs or the ends of the coiled springs adjacent to the balls 15 may be so formed as to constitute sockets, in which case the socket plates 17 are dispensed with.

What I claim as new is:

1. In a vehicle, the combination of two leaf springs, a shock absorber provided with a casing, elastic elements in the casing, and members movable in the casing, the contiguous end of each of the leaf springs terminating directly in said movable members.

2. In a vehicle, the combination of two leaf springs, a casing containing coiled springs, two members movable in the casing, the contiguous ends of each of the leaf springs terminating directly in the movable members.

3. In a vehicle, the combination of two leaf springs, a casing, coiled springs in the casing, two balls to actuate the coiled springs, the contiguous ends of each of the leaf springs terminating directly in the balls.

4. In a vehicle, the combination of two leaf springs, a casing containing three coiled springs, two balls located in the casing adapted to actuate the coiled springs, the contiguous ends of the leaf springs being directly attached to the balls.

Signed at New York in the county of New York and State of N. Y. this 8th day of July A. D. 1913.

RICHARD T. NEWTON.

Witnesses:
C. A. O. ROSELL,
M. E. CONNER.

Copies of this patent may be obtained for five cents each, by addressing the "Commissioner of Patents, Washington, D. C."